Nov. 10, 1970  J. H. FILLOUX  3,538,772

MONITORING APPARATUS

Filed March 14, 1968

INVENTOR.

JEAN H. FILLOUX

BY Anderson, Luedeka,
Fitch, Even & Tabin
ATTORNEYS

United States Patent Office

3,538,772
Patented Nov. 10, 1970

3,538,772
MONITORING APPARATUS
Jean H. Filloux, La Jolla, Calif., assignor to Gulf General Atomic Incorporated, San Diego, Calif., a corporation of Delaware
Filed Mar. 14, 1968, Ser. No. 713,123
Int. Cl. G01l 9/00
U.S. Cl. 73—398
9 Claims

ABSTRACT OF THE DISCLOSURE

Apparatus is described for monitoring a variable physical quantity. Movement of an indicating element is sensed and a cyclical output signal is produced having a series of null points corresponding to reference positions distributed over a range of movement of the indicating element. A feedback system exerts a force on the indicating element which tends to return the indicating element to a position corresponding to the closest of selected ones of the null points. The result is an output signal which indicates the displacement of the indicating element in a given direction from each of a series of positions over its total range of movement.

---

This invention relates generally to monitoring apparatus and, more particularly, to apparatus for monitoring a variable physical quantity, such as pressure or temperature.

The monitoring of variable physical quantities, such as pressure or temperature, may provide useful information in a variety of circumstances. For example, the continuous monitoring of temperature can be of significant aid in the field of meteorology or in the control of various industrial processes. By way of further example, the monitoring of pressure may also be of use in the study of tides and of river levels for flood control.

In many situations, it is desirable that devices for monitoring a variable physical quantity be compact, rugged, reliable and yet highly sensitive. One method of accomplishing continuous monitoring with great accuracy, and which may be embodied in compact, rugged and reliable devices, is known as the "null" method. A typical device employing the null method of detection may include a mirror and means for varying its angular position in accordance with variations in the variable physical quantity being monitored. When the mirror deviates from a prescribed null or reference position, its displacement is detected optically and an error signal is generated. The error signal is fed back in a servo arrangement to adjust the mirror to zero again. The degree of adjustment necessary is used to determine the original signal that caused the mirror to deviate from the zero or reference position and thus the variation in the physical quantity. Typical devices utilizing the null method have heretofore sometimes been unsatisfactory in situations where the mirror deflection from the reference position is relatively large or rapid. This is because, with increasing deviation or increasing frequency, the resolution or linearity of heretofore known devices for encompassing relatively wide deviations or high frequencies has often been unsatisfactory.

Accordingly, it is an object of this invention to provide improved apparatus for monitoring a variable physical quantity.

Another object of the invention is to provide compact, rugged and reliable monitoring apparatus of high sensitivity.

A further object of the invention is to provide monitoring apparatus which provides an accurate and sensitive record over a relatively wide range of variation.

It is another object of the invention to provide an improved gauge for monitoring liquid level.

A still further object of the invention is to provide improved apparatus for monitoring the movement of an indicating element.

Other objects of the invention will become apparent to those skilled in the art from the following description, taken in connection with the accompanying drawings wherein.

Figure 3:
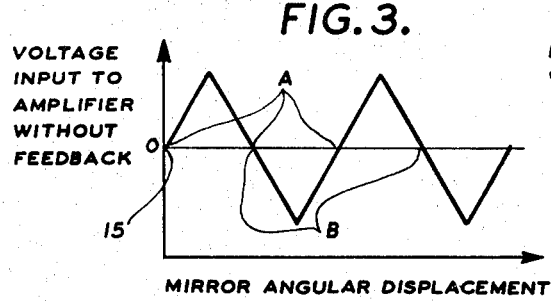
FIGS. 2, 3 and 4 are graphs illustrating operational aspects of the apparatus of FIG. 1.
Figure 2:
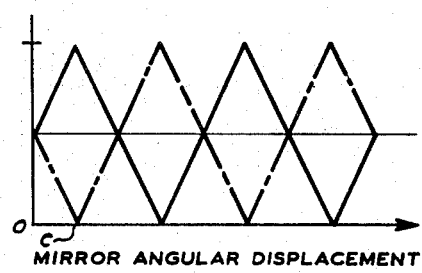

Very generally, apparatus embodying the invention comprises an indicating element 11 movable in response to variation in the physical quantity being monitored. Sensing means 12 are adapted to produce an output signal which, without feedback, is proportional to the displacement of the indicating element from the closest of a plurality of reference points A (FIGS. 2, 3 and 4) distributed over a range of movement of the indicating element. Feedback means 13 is responsive to the output of the sensing means to exert a force on the indicating element which tends to displace the indicating element toward the closest of predetermined reference points B (FIGS. 2, 3 and 4) lying toward one end 15 of the displacement range from the actual indicating element position. This results in an actual output signal representative of the displacement of the indicating element toward the opposite end of the displacement range from the closest predetermined reference point.

Figure 1:
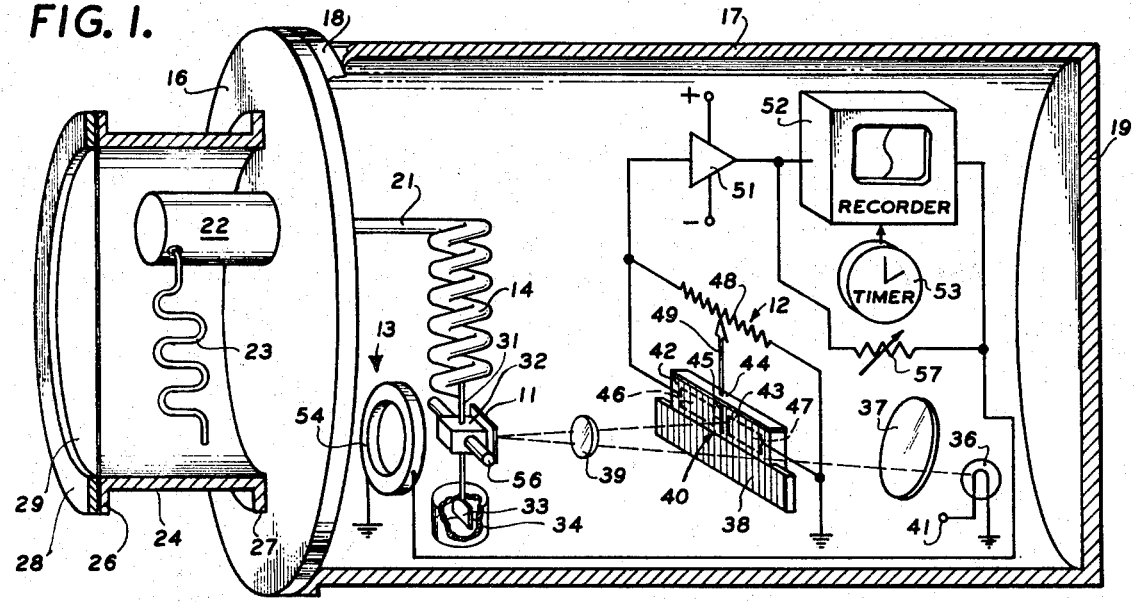
FIG. 1 is a perspective schematic view, partially in section, of apparatus embodying the invention.

Referring now more particularly to FIG. 1, the apparatus embodying the invention illustrated therein is a water level gauge. The illustrated apparatus may be utilized to monitor tidal fluctuations and similar water level fluctuations such as may occur in reservoirs, estuaries, harbors, lakes or rivers. Thus, in addition to studying tidal fluctuations, such other natural phenomena as waves, tsunamies, seiches, wind effects and storm forerunners may also be monitored. For sensing water level, the illustrated embodiment employs a pressure transducer in the form of a Bourdon tube 14. Other types of transducers, depending upon the physical quantity being monitored, may be employed in the apparatus of the invention, such as bimetallic devices, the beam of a torsion balance, or the coil of a galvanometer.

The tide gauge illustrated in FIG. 1 includes a base plate 16 to which the various elements subsequently described may be mounted by means of a frame structure, not illustrated. Such a construction provides a firm and rugged support for the various internal elements of the apparatus. The various internal elements are enclosed and protected from the outside pressure of the water by means of a cylindrical housing 17. The housing 17 is provided with an annular flange 18 which is bolted and sealed to the base plate 16. The opposite end of the cylindrical housing is closed by an integral circular wall plate 19.

The pressure transducer or Bourdon tube 14 is suspended within the housing 17 by a straight end section 21 suitably attached, by means not shown, to the base plate 16. The tube portion 21 communicates through the plate 16 with the interior of a cylindrical air cavity 22. The air cavity is completely enclosed and sealed against outside pressure except for two openings; one communicating with the Bourdon tube 14 through the portion 21 thereof, and one communicating with a capillary tube 23. The capillary tube communicates with the interior of the air cavity 22 and has its opposite end open.

The capillary tube 23 and the air cavtiy 22 are contained within a cylindrical sub-housing 24 provided with a pair of annular flanges 26 and 27 at respective ends. The sub-housing 24 is attached to the outer surface of the base plate 16 and sealed thereto at the flange 27. A clamping ring 28 is secured to the flange 26 and clamps a flexible membrane 29 across the open end of the cylindrical subhousing 24. The space defined by the base plate 16, the sub-housing 24, and the flexible membrane 29 is filled with oil, thus avoiding direct contact between the water and the Bourdon tube 14. This aids in minimizing corrosion. The capillary tube 23 and air cavity 22 constitute a wave filter and are designed to attenuate pressure changes at wave frequencies. Of course, if the apparatus is used to monitor waves, the wave filter arrangement is not utilized.

The end of the helical Bourdon tube 14 opposite the straight portion 21 is closed and is attached to a rod 31. The rod 31 is positioned in alignment with the axis of the helical portion of the Bourdon tube and extends downwardly through a block 32. A paddle 33 is attached to the opposite end of the rod 31 from the Bourdon tube, and is immersed in a fluid contained within a damping cup 34. This helps damp ambient vibration to prevent the Bourdon tube and the sensing means subsequently described from producing spurious signals, Because the Bourdon tube is rigidly supported only at one end, the other end being merely damped from vibration, stick slip is avoided, rendering the Bourdon tube inherently free from hysteresis.

The indicating element 11 is attached to the block 32 and thereby undergoes angular displacement upon rotation of the rod 31 due to changes in pressure sensed by the Bourdon tube 14. In the illustrated embodiment, the indicating element 11 is a planar mirror. The sensing means 12, which is used to sense movement of the mirror 11, is an optical lever. Changes in the angular position of the mirror 11 are converted into electrical signals, as subsequently described, for providing a record of pressure changes.

The optical lever of the sensing means 12 includes a light source 36, a condenser lens 37, a first optical grating or incident grating 38, and an objective lens 39. The light source 36 may be of any suitable type, and it is desirable that the light source be one which supplies a light of constant intensity. A preferred light source is a radiating diode, which produces a nearly monochomatic light. This minimizes limitations on sensitivity and linearity, within the light wave length characteristics herein applicable, due to chromatic aberration in parts of the optical system described below. A miner's lamp may also be satisfactory as a light source. In order to insure that the light from the light source is of relatively constant intensity, current is supplied to the light source at a terminal 41 from a suitable constant current regulator, not shown.

The condenser lens 37 is disposed between the light source 36 and the mirror 11. The condenser comprises a concave lens which operates to collimate the rays of the beam, thereby making the incident beam of uniformly lighted cross section. The area of the uniformly lighted cross section depends upon the size and shape of the condenser lens.

The first or incident side optical grating 38 is positioned in the path of the incident beam and has a plurality of parallel opaque bars or grids. The optical grating may be made easily and inexpensively by photo etching. A more precise method of fabrication is by depositing an opaque coating on a glass support plate and subsequently cutting the desired portions of the opaque coating away with suitable equipment. The opaque bars are of uniform width and are separated by transparent regions of the same width as the bars. The opaque bars are oriented parallel with the rotational axis of the mirror 11.

The objective lens 39 is positioned to focus an image of the incident side optical grating or grid 38 on the mirror and to focus the reflected image of the incident side grating in the plane of the reflected side optical grating 40. With an image of the incident side optical grating superimposed upon the opaque bars of a reflected side optical grating, a maximum amount of light passes the reflected side grating. Conversely, with the image of the incident side grating superimposed on the spaces between the opaque bars of the reflected side grating, a minimum amount of light passes the reflected side grating. Variation in the rotational position of the mirror 11 causes the image of the incident side grating to move relative to the reflected side grating in a direction transverse to the opaque bars. This produces variation in the amount of light passing the reflected side grating between the maximum and minimum amounts. Accordingly, the signal produced by suitable photo-sensing means positioned to sense the amount of light passing the reflected side grating will, without feedback, be proportional to the displacement of the mirror from the minimum light passage condition.

By feeding back the output of the sensing means in a particular manner, the actual output signal of the sensing means may be made representative of the displacement of the indicating element from selected reference points. The manner of feeding back utilizes the sensing means output to produce a proportional force which is exerted on the mirror in a direction tending to displace the mirror toward the closest of the selected reference points. Thus, at each selected reference point, the actual output signal is a null or zero. These multiple nulls or zero reference points, which result in a repetitive error signal due to the periodic nature of the light variation, may be used to indicate the total displacement of the mirror very accurately. The total displacement of the mirror may be determined by counting the number of full excursions or cycles of the error signal plus that portion of the last increment of the error signal recorded.

The illustrated apparatus, described more fully below, operates basically on this multiple null principle but utilizes a type of push-pull or complementary positive-negative arrangement to enhance the available excursion. In doing so, the sensing means output, in the absence of feedback, varies from positive to negative. The actual output signal reference points selected in the illustrated apparatus correspond to every other point at which the sensing means non-feedback output crosses zero. It is to be understood, however, that an arrangement producing only positive or only negative output excursions in the absence of feedback may also be used. With non-feedback excursions only in one direction, each zero point may correspond to a reference point in the actual output signal.

The reflected side optical grating 40 has two sections, 42 and 43, and is positioned adjacent the incident side optical grating 38 to be in the path of light reflected from the mirror 11. The reflected side optical grating sections 42 and 43 lie in the same plane as the incident side grating 38 and the spacing, width and orientation of the opaque bars in the reflected side grating sections are the same as in the incident side grating. Moreover, the two reflected side grating sections are adjacent each other and are separated by a middle bar 45 which is twice the width of the other bars. As a result, the opaque bars on the grating section 42 are offset from the opaque bars on the grating section 43 by the width of one bar, making the equal grid periodicities effectively 180° out of phase.

The objective lens in FIG. 1 provides unit magnification so that an image of the incident side optical grating is superimposed at unit magnification upon the reflected side grating sections. Thus, with the image of the incident side grating focused in exactly superimposed position on the reflected side grating section 42, a maximum amount of light will pass through that grating section, only 50 percent of it being opaque. The other reflected side grating section 43, however, being offset by one bar width, will pass no light since the image of the incident side grating is superimposed on the transparent spaces between the bars of the reflected side grating section 43. This is the condition indicated at C in FIG. 2. As may be seen in FIG. 2, when the mirror 11 moves to displace the image of the incident grating, the amount of light passed by the grating section 43 will increase from 0 toward the maximum and the light passed by the grating section 42 will decrease from the maximum toward 0. For a range of mirror displacement greater than that required to shift the image one space, the light passed by the respective grating sections 42 and 43 will vary cyclically with a 180° phase difference. It will therefore be appreciated that there are equally spaced positions where both sections of the reflected side grating 40 pass equal amounts of light.

A plate 44 is mounted immediately behind the reflected side grating sections 42 and 43 and carries a pair of light sensors 46 and 47. The light sensors may be of any suitable type and are positioned to intercept the reflected light beam immediately past the reflected side grid and to produce an electrical signal representative of the amount of light passing therethrough. In the illustrated embodiment, a pair of solar cells are utilized for the light sensors 46 and 47 and are connected across a load resistor 48. A variable tap 49 connects the juncture between the solar cells 46 and 47 to a point along the resistor 48. One end of the resistor 48 is connected to an amplifier 51 and the other end of the resistor 48 is grounded.

The solar cells 46 and 47 are each so oriented as to produce current flow toward the tap 49 when they are energized. Without the feedback connection subsequently described, this output appears as in FIG. 3. Thus, the voltage input to the amplifier 51 without feedback is cyclical with large mirror displacements peaking in alternating positive and negative directions. The peaks occur when one of the optical grating sections 42 and 43 passes the maximum amount of light and the other, the minimum amount. The nulls A occur when both of the reflected side gratings pass an equal amount of light. The variable tap 49 permits the peaks to be adjusted so that their deviation from 0 is the same for positive and negative directions. The distance between alternate ones of the nulls A represents the spacial periodicity of the optical gratings, and the null points are used as reference points, as will be explained.

The output of the amplifier 51 is used to drive a suitable chart recorder 52 provided with a clock timer 53 for accurate time referencing of the recorder. The output of the amplifier 51 is also utilized in a feedback arrangement, driving a coil 54. A variable resistor 57 is connected in parallel with the recorder. The coil 54 is positioned adjacent a bar magnet 56 attached to the block 32 on the rod 31 which extends from the end of the Bourdon tube 14. When energized, the coil 54 tends to displace the permanent magnet 56, thereby exerting a torque on the rod 31. The direction of the displacement is in one direction for positive current feedback and in the opposite direction for negative current feedback.

Figure 4:
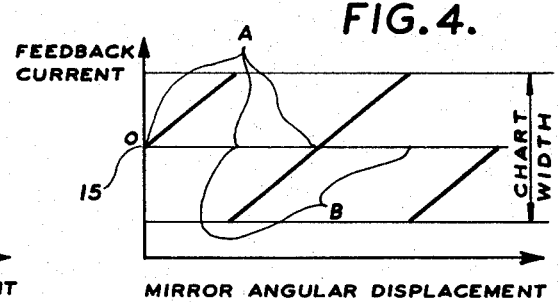

The result of the feedback arrangement may be seen in FIG. 4. The feedback current is such as to urge the coil 54 to return the mirror to the closest of the reference points B, which are every other reference point A. Feedback current is represented by a series of ramp signals. The negative portion of each of such signals represents coil current which urges the mirror in one direction, and the positive portion of each of such signals represents coil current which urges the mirror in the opposite direction. Where a ramp crosses zero, no torque is applied to the mirror. Where a ramp reaches maximum in either direction, its polarity changes very quickly as the mirror passes through the associated reference point A. This feedback current is used to drive the chart recorder 52, and the variable resistor 57 is provided to permit adjustment of the chart scale. The record is linearly related to the pressure on the Bourdon tube 14. Because the multiple nulls or reference points are equally spaced, the instrument automatically resets after a full period has been traversed, maximizing the range for a given sensitivity. The effective chart width may be rigorously calibrated, since it depends only on fixed parameters, that is, the elastic properties of the Bourdon tube, the focal length of the objective, and the grid periodicity.

It may be noted that the incident side grating 38 is made longer in the dimension transverse to the plane of the light beam axes than the corresponding dimension of the reflected side grating. Thus, although for a given objective the maximum range or period is limited by the spacing of the opaque bars in the optical gratings, deflections of the mirror beyond one period may be sensed with accuracy. Theoretically, the maximum number of periods which may be traversed without degradation of accuracy is equal to the expression, $$L - \frac{w}{p}$$

where L is the width of the incident grating, $w$ the width of the reflected side grating and $p$ the length of the portion of image displacement having a linear relation to mirror displacement. This linear portion becomes smaller and smaller with increasing fineness of the optical gratings until it falls to 0. At the latter point, the instrument characteristic is entirely non-linear. The grid spacing at which the optical lever characteristic loses any linearity approximates the following relationship:

$$d_{min.} = \frac{2wF}{M}$$

where $d_{min.}$ is the minimum usable grid spacing, $w$ is the wave length of the light beam, F the focal length of the objective, and M the mirror size (or the size of the filament image).

Although the optical lever used in the sensing means 12 in the illustrated embodiment is shown schematically, a particular construction is shown and described in copending U.S. application Ser. No. 589,298, filed Oct. 25, 1966 and assigned to the assignee of the present invention. In accordance with the description contained in the aforementioned pending application, the apparatus of the present invention may be modified for certain specific applications.

Figure 5:
FIG. 5 is a plan view illustrating a type of record which may be produced by the apparatus of FIG. 1.

In FIG. 5, a portion of a strip chart recording of typical tidal fluctuations is illustrated. The oscillations superimposed upon the tidal rise and fall represent natural oscillatory modes such as the splashing motion of a bay. For a study of the tide, the instrument can be used as a permanent station and attended periodically, or as a mobile temporary station. As a mobile unit, it can be used to determine the tide constancy at points where they have not yet been established. Immersed, the instrument is not vulnerable to vandalism and does not require constant surveillance.

In addition to tidal measurements, the instrument is directly adaptable to the study of many varieties of water motions, not only in the open ocean, but also in partially closed basins, rivers and lakes. Other obvious applications include the measurement of long waves and storm forerunners, tsunamies on the continental shelf and in harbors, seiches in lakes and basins, and wind effects on large bays and estuaries. The apparatus, in addition to the recorder or in place of the recorder, may be provided with transmitting equipment to send information by cable or radio to a shore station and may, therefore, be used as a tsunamie or seich warning system. It may also be used to record ocean bottom shifts associated with earthquake activity.

A satisfactory operable device may be constructed in accordance with the following specifications:

Outer Housing—8⅜" OD, 7⅝" ID, 12½" long, ¾" thick end plates; hard anodized aluminum.
Depth Range—Up to 150 meters.
Tidal Range—30 cycles of chart paper with 1 meter per cycle; chart width equals 6 centimeters; equivalent chart width for total range=30×6=180 centimeters.
Grid Periodicity—25 per centimeter or 0.4 millimeters.
Focal Length—7.94 centimeters.
Power Requirements—8 mercury cells (RM–42) for 40 days operation at ¾" per hour chart speed.

As an alternative to the described construction, the apparatus of the invention may be mounted in a large aluminum sphere which is attached to an anchor and which has sufficient buoyancy to return the apparatus to the surface when the anchor is released.

The apparatus of the invention may also be utilized as a tiltmeter, temperature measuring device, etc., depending upon the particular transducer for translating changes in the physical quantity being measured into changes in the position of an indicating element. The high sensitivity of the apparatus is maintained over a relatively wide range by utilizing the multiple null or reference point operation of the optical lever, assuring linearity of response.

Various modifications of the invention, in addition to those shown and described herein, will become apparent to those skilled in the art from the foregoing description and accompanying drawings.

What is claimed is:

1. Apparatus for monitoring a variable physical quantity comprising an indicating element movable in response to variation in the physical quantity over a predetermined range, sensing means responsive to a displacement of the indicating element by producing an output signal having an amplitude indicative of said displacement which is cyclical over a plurality of equal periods, each period corresponding to an increment of displacement of the indicating element within the predetermined range of movement thereof, and feedback means responsive to the amplitude of the output signal of the sensing means by producing a feedback signal, means responsive to said feedback signal for exerting an output force on said indicating element proportional to the amplitude of the output signal of said sensing means urging said indicating element toward a position wherein the amplitude of the output signal of said sensing means is zero within one of said periods, said output force of said feedback means being in one direction for positive output of said sensing means and being in the opposite direction for negative output of said sensing means, and means for recording the feedback signal as indicative of the displacement of said indicating element within each of successive increments corresponding to said periods over the predetermined range.

2. Apparatus according to claim 1 wherein said indicating element has a rotary movement and wherein said feedback means include a permanent magnet mechanically coupled to said indicating element, and further include an electromagnetic coil positioned to exert a torque on said permanent magnet in a direction dependent on the direction of current in said coil, said coil being electrically coupled to the output of said sensing means.

3. Apparatus according to claim 1 wherein said indicating element comprises a mirror having a rotary movement, and wherein said sensing means comprises an optical lever.

4. Apparatus according to claim 2 wherein said indicating element comprises a mirror having a rotary movement, and wherein said sensing means comprises an optical lever including first and second optical gratings and means for focusing an image of said first optical grating on said second optical grating, said first and second optical gratings each having a plurality of mutually parallel elongated opaque bars, said second optical grating having first and second adjacent portions in which the periodicities of the opaque bars in each portion are of equal width and effectively 180° out of phase with respect to the opaque bars of the other portion.

5. Apparatus according to claim 2 wherein said optical lever includes a first and second optical grating means each having a plurality of mutually parallel elongated opaque bars, means for focusing an image of said first optical grating means on said second optical grating means after reflection of such image from said mirror, and light sensing means positioned on the side of said second optical grating means opposite said mirror for sensing the amount of light passing through said second optical grating means.

6. Apparatus according to claim 1 wherein said recording means comprises a chart recorder having a recording width corresponding to the maximum variation in the actual output signal, whereby the total variation in the physical quantity may be determined by adding the number of traverses and the last portion of traverse made by the stylus of said recorder.

7. A tide gauge comprising a Bourdon tube for sensing water pressure, a mirror attached to said Bourdon tube and movable in response to variation in the pressure over a predetermined range, sensing means responsive to a displacement of the mirror by producing an output signal having an amplitude indicative of said displacement which is cyclical over a plurality of equal periods, each period corresponding to an increment of displacement of the mirror within the predetermined range of movement thereof, feedback means providing a feedback signal responsive to the amplitude of the output of the sensing means, said feedback means including a permanent magnet attached to said mirror and a coil responsive to said feedback signal for producing a force urging said indicating element toward a position wherein the amplitude of the output of said sensing means is zero within one of said periods, said force being in a direction dependent on the direction of current in said coil, and means for recording the feedback signal as indicative of the displacement of said mirror within each of successive increments corresponding to said periods over the predetermined range.

8. Apparatus according to claim 7 including a pressure variation filter coupled to said Bourdon tube for attenuating pressure changes at wave frequencies.

9. Apparatus for monitoring the movement of an element comprising sensing means responsive to a displacement of said element by producing an output signal having an amplitude indicative of said displacement which is cyclical over a plurality of equal periods, each period corresponding to an increment of displacement of the indicating element within the range of movement thereof, feedback means responsive to the amplitude of the output of the sensing means by producing a feedback signal and including means responsive to said feedback signal for exerting an output force on said element proportional to the amplitude of the output signal of said sensing means urging said element toward a position wherein the amplitude of the output of said sensing means is zero within one of said periods, said output force of said feedback means being in one direction for a positive output of said sensing means and being in the opposite direction for negative output of said sensing means, and means for recording the feedback signal as indicative of the displacement of said element within each of successive increments corresponding to said periods over the predetermined range.

References Cited

UNITED STATES PATENTS

| | | |
|---|---|---|
| 1,930,496 | 10/1933 | Wilson et al. |
| 2,693,990 | 11/1954 | Fink. |
| 2,955,467 | 10/1960 | Parkhurst _____ 73—300 |
| 3,301,062 | 1/1967 | Reesby et al. _____ 73—418 XR |

DONALD O. WOODIEL, Primary Examiner

U.S. Cl. X.R.

73—170, 301, 418